Jan. 24, 1939.    A. H. RINEY ET AL    2,145,132
APPARATUS FOR BLENDING LIQUIDS
Filed Sept. 10, 1935
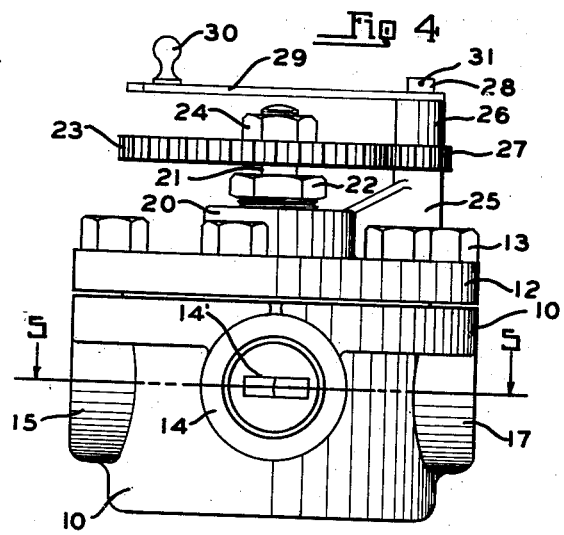
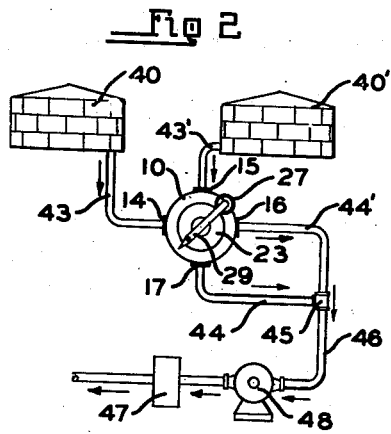
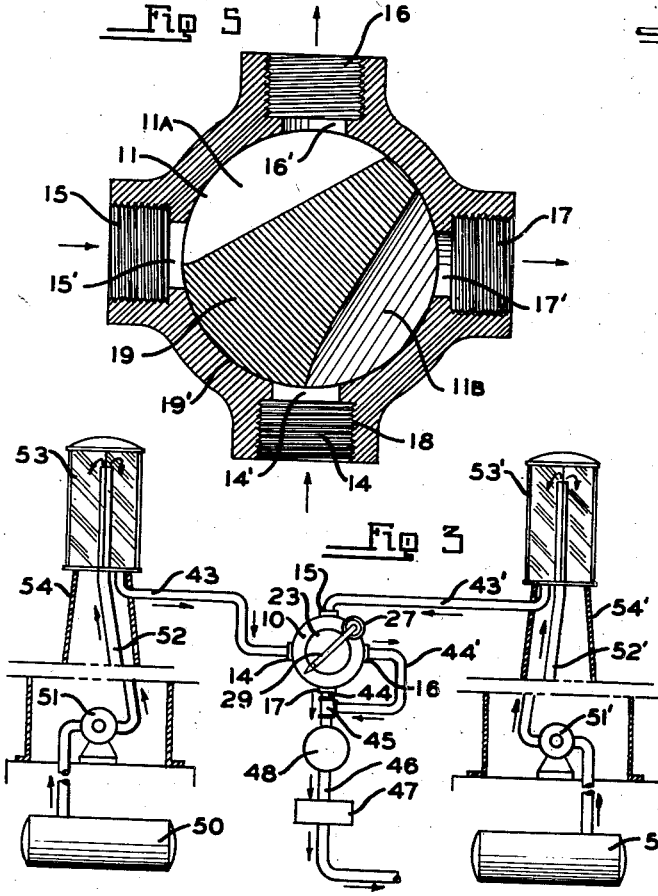
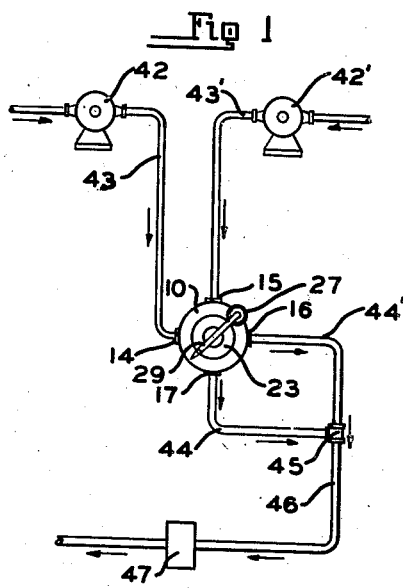
INVENTOR.
ARTHUR H. RINEY
LLOYD T. GIBBS
BY
ATTORNEYS.

Patented Jan. 24, 1939

2,145,132

UNITED STATES PATENT OFFICE 2,145,132

APPARATUS FOR BLENDING LIQUIDS

Arthur H. Riney and Lloyd T. Gibbs, Bartlesville, Okla., assignors to Phillips Petroleum Company, Bartlesville, Okla., a corporation of Delaware Application September 10, 1935, Serial No. 39,989

2 Claims. (Cl. 251—104)

This invention relates to apparatus for blending fluids, and in particular to apparatus for blending gases and liquids for use with a fluid dispensing system.

The object of this invention is to efficiently and accurately blend fluids in predetermined desired proportions and to control and regulate the mixing of the fluids to give any desired proportional mixture.

While the present invention has a wide range of adaptability and may be used in connection with the blending and mixing of practically any type or kind of fluids, the embodiment of the invention to be herein described has been designed wtih an especial view to handling liquids of the hydrocarbon type, such as gasoline, fuel oil, and the like.

Still further objects and advantages of this invention will be appreciated and become more apparent upon a consideration of the following specification and the attached drawing, forming a part thereof, and wherein like reference characters designate like parts throughout the several views, and wherein, Fig. 1 illustrates diagrammatically one embodiment of the fluid blending and dispensing device, constituting this invention, Fig. 2 illustrates diagrammatically another embodiment of the invention, Fig. 3 illustrates diagrammatically still another embodiment of the invention, Fig. 4 illustrates a side view of a fluid blending unit or device to be used in connection with such mixing and blending devices shown diagrammatically in the above referred to figures, and Fig. 5 is a cross-sectional view of Fig. 4 taken on line 5—5 thereof, and looking in the direction of the arrows and showing the interior of the blending device.

In the drawing is shown a blending system having a proportioning device or unit comprising a bowl shaped hollow housing or casing 10, so formed as to present a chamber 11 interiorly thereof. To close the upper, or open side of the casing 10, and to form a complete chamber 11 there is provided a closure plate 12 held in position by the bolts 13. In the side walls of the casing 10 there are formed four equi-spaced openings, such as the one 14, which terminate at the exterior of the casing 10 in screw thread pipe fittings 18. The openings 14 and 15 are inlets, and lead to the chamber 11, while the openings 16 and 17 constitute outlets and lead from the chamber 11. The orifices 16' and 17' of the outlets 16 and 17 respectively are plain unobstructed openings, while the orifices 14' and 15' of the inlets 14 and 15 respectively are restricted as shown in Fig. 4, and present a relatively long narrow aperture through which the liquid enters the chamber 11 of the blending unit 10.

Within the chamber 11 of the proportioning unit 10 there is positioned a revolvable segmental plug 19 which divides the chamber 11 into the compartments 11a and 11b, the first mentioned compartment being associated with inlet 15 and outlet 16, and the latter with inlet 14 and outlet 17, as is shown in Fig. 5. The peripheral edge 19' of the plug 19, forms a close sliding contact with the interior side walls of the chamber 11, and when the plug 19 is rotated the edge 19' is moved to open or close the inlet orifice 14' and 15' to any extent desired.

The upper face of the cover plate 12 is centrally provided with a bushing or guide 20 through which extends a stem 21 that is integral with or secured to the segmental plug 19. A gland nut 22 is screwed down over the stem 21 and into the bushing 20 to form a tight fit therewith and to prevent the escape of liquid from the chamber 11 out through the bushing 20. Keyed to the upper end of the stem 21 is a relatively large gear wheel 23 which is retained in place by the nut 24.

Secured to the upper face of the cover plate 12 or integral therewith is a support 25 in which there is rotatably mounted the upstanding shaft 26 having keyed thereto the relatively small gear 27 which is in meshing engagement with the large gear 23. The upper end of the shaft 26 terminates in a square head as shown at 28, and carries an elongated combination pointer and arm 29 having at one end the handle piece 30. A cotter pin 31 or any other suitable member is utilized to maintain the arm 29 in place upon the shaft 26.

It should now be appreciated that any movement through a horizontal plane of the arm 29 will rotate the shaft 26 and the gear 27, and as this gear meshes with gear 23 it also will be rotated, and in this manner the stem 21 and plug 19 will be caused to rotate and so regulate and vary the restricted area of the inlet orifices 14' and 15'. In Figs. 4 and 5 the plug 19, the actuating arm 29 and their associate parts are all arranged in a neutral position, that is, the peripheral edge 19' of the plug is so positioned as to close one half of each of the inlet orifices 14' and 15'. Regardless of the position of the plug 19, the combined open area of the two restricted orifices 14' and 15' is always a constant and exactly equal to the area of either one of these orifices.

It is to be understood that a liquid of one type will enter the proportioning device through orifice 14' and flow out through outlet 17' and that another liquid will enter at orifice 15' and flow through outlet 16'. The two different liquids, constituting two different streams are later brought together, as will be described, to form a blend. The proportioning of the liquids is controlled by regulating the position of the plug 19 to give the desired openings at the inlet orifices 14' and 15'.

Assuming that the gears 23 and 27 have a ratio of 5:1, and it is possible to move the pointer 29 through an arc of 180° or more, and as the pointer is connected through these gears with the plug 19, it may be moved through any desired arc up to and including 180° in order to control and regulate the size of the inlet orifices. For blending fluids, such as those handled in gasoline filling stations, the size of the orifices 14' and 15' may be made approximately .14 of a square inch in area. In order to produce the accuracy required for perfect blending it is necessary to design the apparatus so that a movement of a few degrees of the pointer will add but slightly to the area of one inlet port, such as 14', and subtract but slightly from the area of the other inlet port 15'. The sum of the exposed areas of ports 14' and 15' is at all times a constant. If the orifices 14' and 15' are constructed so that the length of the elongated slot is approximately .7 of an inch, the width should then be about .2 of an inch. Fluid from one source of supply is connected to the orifice 14', and a fluid from a second source of supply is connected to orifice 15'. The outlet orifices 16' and 17' can be of any convenient shape, and as these are merely the outlets for the blending device, the area of these openings is not important so long as they are equal to or greater than the areas of orifices 14' and 15' respectively.

One of the particular purposes for which this device is designed is for use in connection with blending two liquids, such as gasolines, each having a different vapor pressure, and the device is used to produce an accurate blend with a vapor pressure which may be anything between the vapor pressure of the two products, depending upon the setting of the pointer 29, to control the inlet orifices 14' and 15'. For example, when with this particular device as above described, two gasolines are blended, one having a vapor pressure of 7#, and the other having a vapor pressure of 13#, a movement of .1 of an inch of the plug 19 will produce a 1# difference in the vapor pressure of the resulting blend, which is the result of combining at some later stage the liquids issuing from the outlets 16' and 17'.

The proportioning unit above described is capable of many embodiments and adapts itself readily to various types of dispensing systems and methods. In Figs. 1, 2 and 3 there are shown several types of liquid dispensing systems wherein the proportioning unit 10 is combined. This unit is substantially the same as the one above described, and like reference characters designate like parts throughout the several figures.

With particular reference now to Fig. 1 there is shown a liquid dispensing system which includes a brace of pumps 42 and 42' which are interposed in the pipes 43 and 43' and act to force the liquid from its source into inlets 14 and 15 of the liquid blending unit 10. Thus it can be appreciated that by setting the pointer 29 at the proper position to give the desired blend, a predetermined mixture of the liquids from pipes 43 and 43' may be had. The liquid after passing through the proportioning unit 10 leaves the same through the outlets 16 and 17 respectively in the proportion desired, and flow respectively into the pipes 44 and 44', both of which are coupled at 45 to a pipe 46 into which the predetermined blend of the liquids from pipes 43 and 43' flow. A metering device 47 is interposed in the pipe 46 to measure the volume flow. With this arrangement it is possible to produce a single liquid which is composed in any desired proportions of the two liquids contained in the pipes 43 and 43'. This is true and possible because of the proportioning unit 10 which may be set to control the mixture of the liquids from the pipes 43 and 43' and so produce various blends dependent upon the demand.

In Fig. 2 there is disclosed another type of system and method for dispensing and blending liquids. The elements of this system are in most respects similar to those used in connection with the system and method for dispensing liquids described in relation with Fig. 1, but notice is given that in this instance a single pump 48 is used and that it is interposed in the pipe 46 through which the blended liquid flows. By this arrangement the suction on the inlet orifices 14' and 15' of the proportioning unit 10 is uniform and the two liquids are pulled therethrough from their sources in tanks 40 and 40' in volume truly in proportion to the size of the regulated and controlled inlet orifices 14' and 15'. This results in a more perfect and accurate proportioning of the liquids from the tanks 40 and 40', and so by use of this system and method the desired blend of the two liquids is positively and accurately produced in true accordance with the setting and controlling of the inlet orifices 14' and 15'.

A still further embodiment of this invention is illustrated in Fig. 3, and it constitutes a combination of the two liquid blending and dispensing systems and methods described in relation to Figs. 1 and 2. Here there are provided a pair of liquid storage tanks 50 and 50', which by means of pumps 51 and 51' force the liquid through the pipes 52 and 52' into a pair of visible bowls 53 and 53'. A pair of conventional liquid dispensing pump housings 54 and 54' are provided to encase the pumps and their associated parts. The liquid from the tanks 50 and 50' is forced up into the bowls 53 and 53' respectively. From these bowls the liquid will flow through the pipes 43 and 43' to the controlled inlets 14' and 15' and will pass through the proportioning unit 10 and into the pipes 44, 44' and 46 in the same manner as described with relation to Fig. 1. Here, as before, the proportioning unit 10 is capable of being set so as to control the size of the inlet orifices 14' and 15' and so produce a blended liquid of any desired mixture. In addition to this arrangement there may be provided a pump, such as the one shown at 48, positioned on the discharge side of the proportioning unit 10 in order that equal suction will be exerted on the inlet orifices 14' and 15' regardless of the size of their relative openings. By virtue of this pump 48 and the suction created thereby, the liquids from the bowls 53 and 53' are drawn through the inlet orifices 14' and 15' respectively, in volume exactly in proportion to the size of the inlet orifice openings and in this manner it is possible to produce a true blend of the two liquids of any desired mixture by merely setting the handle 29 of the proportioning unit 10 and to positioning the plug 19 to control the size of the inlet orifice.

What we claim and desire to secure by Letters casing, a cylindrical chamber within the casing,